US012381419B2

(12) United States Patent
Sato et al.

(10) Patent No.: US 12,381,419 B2
(45) Date of Patent: Aug. 5, 2025

(54) CONTACTLESS POWER SUPPLY DEVICE FOR USE WITH A HANDLE AND MAIN BODY CASE

(71) Applicant: HOSIDEN CORPORATION, Osaka (JP)

(72) Inventors: Eiji Sato, Osaka (JP); Takayuki Nagata, Osaka (JP); Fumio Ohta, Osaka (JP)

(73) Assignee: HOSIDEN CORPORATION, Osaka (JP)

( * ) Notice: Subject to any disclaimer, the term of this patent is extended or adjusted under 35 U.S.C. 154(b) by 862 days.

(21) Appl. No.: 17/586,938

(22) Filed: Jan. 28, 2022

(65) Prior Publication Data

US 2022/0285985 A1    Sep. 8, 2022

(30) Foreign Application Priority Data

Feb. 1, 2021   (JP) ................................. 2021-014188

(51) Int. Cl.
*H01M 10/46* (2006.01)
*H02J 50/00* (2016.01)
(Continued)

(52) U.S. Cl.
CPC ............ *H02J 50/10* (2016.02); *H02J 50/005* (2020.01); *H02J 50/60* (2016.02)

(58) Field of Classification Search
CPC .......... H02J 50/005; H02J 50/10; H02J 50/60; B25F 5/026; B25F 5/02
(Continued)

(56) References Cited

U.S. PATENT DOCUMENTS

2005/0161241 A1   7/2005  Frauhammer et al.
2011/0114345 A1   5/2011  Schlesak et al.
(Continued)

FOREIGN PATENT DOCUMENTS

DE   102020115051 A1 * 12/2020   .......... B24B 23/005
EP       2 329 923 A2     6/2011
(Continued)

OTHER PUBLICATIONS

Machine translate of EP2329923A2 (Jun. 8, 2011) (Year: 2011).*
Extended European Search Report from European Patent Application No. 22153081.9 dated Jul. 1, 2022.

*Primary Examiner* — Edward Tso
(74) *Attorney, Agent, or Firm* — Dilworth & Barrese, LLP.; Michael J. Musella, Esq.

(57) ABSTRACT

A contactless power supply device includes a handle attachable and detachable with respect to a main body case at least partially covering a main body part including an electric unit, a power transmission module to be provided to protrude from the main body case, and having a power transmission coil electrified based on power supplied to the main body part, a power reception module housed in the handle to face the power transmission module when the handle is fixed to the main body case, and having a power reception coil contactlessly supplied with power via the power transmission coil, and a detection unit provided in the handle, driven based on the power supplied via the power reception module, and configured to detect whether the handle is being gripped.

16 Claims, 4 Drawing Sheets

(51) Int. Cl.
*H02J 50/10* (2016.01)
*H02J 50/60* (2016.01)

(58) Field of Classification Search
USPC .............................. 320/107, 108, 114, 115
See application file for complete search history.

(56) References Cited

U.S. PATENT DOCUMENTS

2017/0207660 A1\* 7/2017 Kato ........................ B41J 29/13
2020/0384627 A1 12/2020 Numata

FOREIGN PATENT DOCUMENTS

| | | | | | |
|---|---|---|---|---|---|
| GB | 2410205 A | \* | 7/2005 | ............. | B23B 25/06 |
| JP | 2020-40163 A | | 3/2020 | | |

\* cited by examiner

CONTACTLESS POWER SUPPLY DEVICE FOR USE WITH A HANDLE AND MAIN BODY CASE

CROSS REFERENCE TO RELATED APPLICATIONS

This application is based on and claims priority under 35 U.S.C. Section 119 to Japanese Patent Application No. 2021-014188 filed on Feb. 1, 2021, the entire content of which is incorporated herein by reference.

TECHNICAL FIELD

This disclosure relates to a contactless power supply device for contactlessly supplying power using a power transmission coil and a power reception coil.

RELATED ART

Conventionally, electric devices that include an electric unit driven by an actuator have been utilized. Some of these electric devices are configured such that a handle can be mounted when the device is in use and removed when the device is not in use (e.g., US 2011/0114345A1).

An electric drill is disclosed in US 2011/0114345A1. In this electric drill, a main body part that includes a chuck for holding a drill bit is provided with a main handle, and the main body part is further provided with an auxiliary grip (corresponds to a "handle" of the instant invention). The auxiliary grip is provided with a coil capable of contactlessly receiving power supply from a coil provided in the main body part.

SUMMARY

In the technology described in US 2011/014345A1, the auxiliary grip is provided with a sensor unit, a communication means, and a coil serving as an energy reception means, and the main body part is provided with a coil that is connected to a reception means constituting an amplifier. The coil provided in the main body part is disposed within a housing. However, the technology disclosed in US 2011/0114345A1 does not describe the mode for mounting the auxiliary grip to the main body part, and there is room for consideration in improving power supply efficiency between the main body part side and the auxiliary grip.

Embodiments of the present invention are directed to a contactless power supply device with enhanced power supply efficiency between a main body part side and a handle.

A contactless power supply device of this disclosure includes a handle attachable and detachable with respect to a main body case at least partially covering a main body part including an electric unit, a power transmission module to be provided to protrude from the main body case, and having a power transmission coil electrified based on power supplied to the main body part, a power reception module housed in the handle to face the power transmission module when the handle is fixed to the main body case, and having a power reception coil contactlessly supplied with power via the power transmission coil, and a detection unit provided in the handle, driven based on the power supplied via the power reception module, and configured to detect whether the handle is being gripped, the power transmission module acquiring detection information indicating a detection result of the detection unit in response to the contactless power supply, and outputting, to the electric unit, a control signal for controlling driving of the electric unit based on the detection information.

In this case, the power transmission module is provided to protrude from the main body case that covers the main body part from the outside, and the power transmission module can thus be provided on the outside of the main body part. The power reception module provided in the handle can thus be brought closer to the power transmission module, enabling power transmission efficiency (power supply efficiency) between the power transmission module and the power reception module (between the power transmission coil and the power reception coil) to be improved. Also, replacement and maintenance of the power transmission module is facilitated, compared to the case where the power transmission module is disposed within the main body part.

Furthermore, whether the user is gripping the handle can be detected, according to the detection result of the detection unit provided in the handle, and driving of the electric unit can be controlled according to the detection result.

Also, in one embodiment of the contactless power supply device, a configuration can be adopted in which the handle is fixed to the main body case by screwing a screw part provided in the handle into a screw hole part provided in the main body case, the screw part is provided in a central portion of the power reception coil and a power reception board included in the power reception module, as viewed in an axial direction of the screw part, and the screw hole part is provided in a central portion of the power transmission coil and a power transmission board included in the power transmission module, as viewed in an axial direction of the screw hole part.

In this case, the handle can be mounted to the main body case with the screw part and the screw hole part, and alignment of the power transmission module and the power reception module at the time of mounting can be facilitated.

Also, in one embodiment of the contactless power supply device, a configuration can be adopted in which the main body case is constituted by a metallic material, and the power transmission module is covered with a magnetic resin, apart from a surface on a side facing the power reception module.

In this case, even if the main body case is constituted by a metallic material, the power transmission module is covered with a magnetic resin apart from the surface on the side facing the power reception module, and the power transmission module is provided on the outside of the main body case, thus enabling the influence of the metallic material (main body case) on contactless power supply to be suppressed, and allowing contactless power supply to be appropriately performed. Also, magnetic flux can be efficiently transmitted between the power transmission coil and the power reception coil due to the magnetic resin.

Also, in one embodiment of the contactless power supply device, a configuration can be adopted in which the power transmission module is to be electrically connected to the electric unit via a cable inserted through a hole part formed in a surface of the main body case facing the power transmission module.

In this case, the cable can be connected to the electric unit without the cable being exposed on the outside with respect to the outer peripheral portion of the power transmission module, in plan view of the power transmission module, thus enabling mechanical damage to the cable to be suppressed and the cable to be protected.

Also, in one embodiment of the contactless power supply device, a configuration can be adopted in which an outer peripheral portion of the power transmission module is surrounded by a wall part standing erect from the main body case.

In this case, it is possible to prevent the power transmission module from being impacted externally. Also, by adopting a configuration in which the power transmission module is positioned by the wall part when disposed, disposition of the power transmission module can be facilitated. Also, magnetic flux from the power transmission module can be shielded by the wall part, and leakage of magnetic flux (leakage flux) externally can be reduced.

Also, in one embodiment of the contactless power supply device, a configuration can be adopted in which the handle is fixed to the main body case by screwing a screw part provided in the handle into a screw hole part provided in the main body case, the screw part is constituted using a magnetic material, and a permanent magnet is provided on a base end side of the screw part of the handle and a magnetic detection element is provided on a bottom side of the screw hole part of the main body case.

In this case, the magnetic detection element is able to detect the magnetic flux of the permanent magnet via the screw part, due to the handle being mounted to the main body case while the magnetic flux from the permanent magnet passes through the screw part. Accordingly, it can be detected that the handle is mounted to the main body case according to the detection result of the magnetic detection element.

Also, in one embodiment of the contactless power supply device, a configuration can be adopted in which the handle is fixed to the main body case by screwing a screw part provided in the handle into a screw hole part provided in the main body case, the screw part is constituted using a magnetic material, and a permanent magnet is provided on a base end side of the screw part of the handle and a reed switch is provided on a bottom side of the screw hole part of the main body case.

The handle being mounted to the main body case can also be detected in this case. Also, the reed switch operates in response to an external magnetic field, thus enabling power for operating the reed switch to be rendered unnecessary.

DESCRIPTION OF EMBODIMENTS

A contactless power supply device according to this disclosure is configured to be able to efficiently supply power contactlessly to a main body part of an electric device and to a handle that is attachable and detachable with respect to a main body case of the main body part. Hereinafter, a contactless power supply device 1 of this embodiment will be described.

Figure 1:
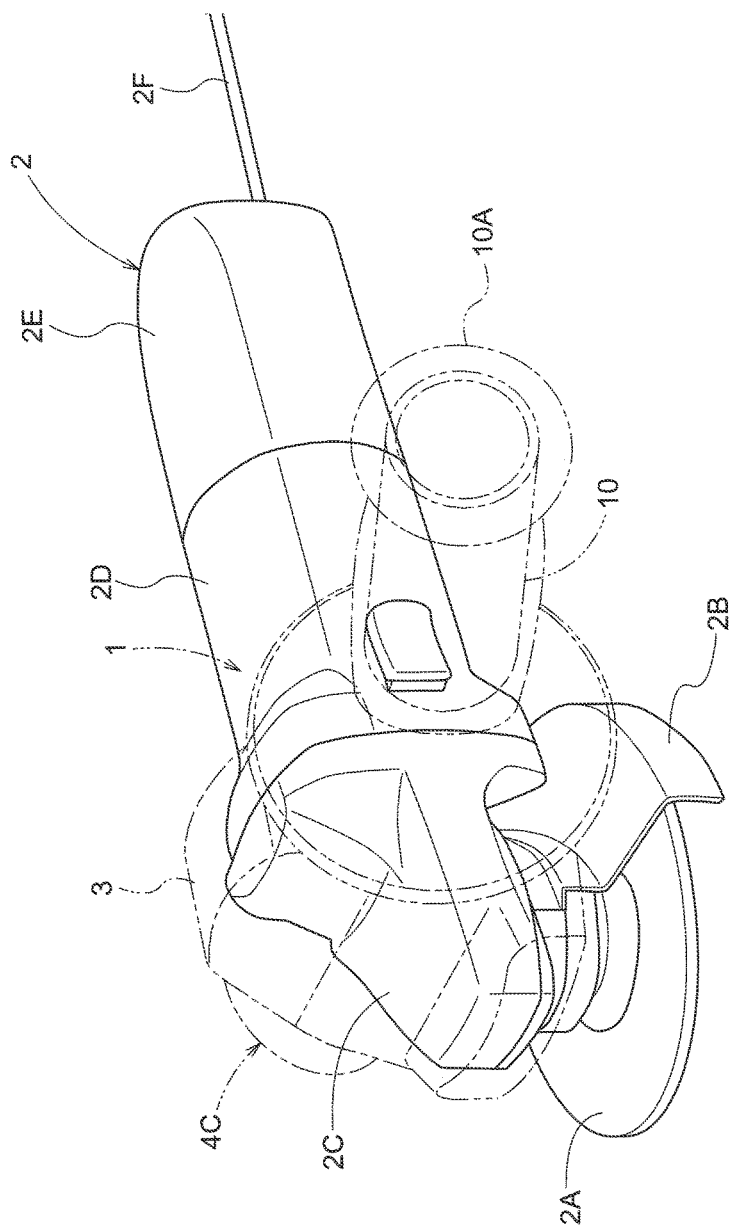
FIG. 1 is a diagram showing an example of an electric device provided with a contactless power supply device.

FIG. 1 is an electric device 2 provided with the contactless power supply device 1. In FIG. 1, a disk grinder is shown as the electric device 2. Accordingly, hereinafter, the electric device 2 will be described as the disk grinder 2.

In this embodiment, as shown in FIG. 1, a main body case 3 at least partially covering the main body part that includes an electric unit is provided separately from the disk grinder 2. The disk grinder 2 is constituted to include a grinder 2A, a wheel guard 2B, a gear cover 2C, a housing 2D and a tail cover 2E. The electric unit corresponds to a gear (not shown) for rotating the grinder 2A of the disk grinder 2, an actuator and a control board that controls the gear and the actuator. Thus, the main body part that includes the electric unit corresponds to a region consisting of the gear cover 2C that contains the gear, the actuator and the control board, the housing 2D and the tail cover 2E.

A first opening portion 4A and a second opening portion 4B (see FIG. 3) are formed in the main body case 3. The main body case 3 is constituted by a metallic material, and the inside is formed to be hollow. The first opening portion 4A and the second opening portion 4B are provided so as to communicate with a space 5 of this hollow (see FIG. 3). As shown in FIG. 1, the main body case 3 is provided to at least partially cover a region consisting of the gear cover 2C, the housing 2D and the tail cover 2E. In this embodiment, the main body case 3 is provided to cover the gear cover 2C and part of the housing 2D. That is, the main body case 3 is provided in the disk grinder 2 with the gear cover 2C and part of the housing 2D housed in the space 5. The main body case 3 is provided with the remaining portion of the housing 2D and the tail cover 2E protruding from the first opening portion 4A, and is provided with the grinder 2A and the wheel guard 2B protruding from the second opening portion 4B. Also, it is favorable for the main body case 3 to be fastened and fixed using a screw or a locking mechanism, for example, so as to not shift positionally when the disk grinder 2 is in use. It is, of course, also possible to adopt a configuration in which the gear cover 2C is not provided, and the gear and the like are covered by only the main body case 3.

Figure 2:
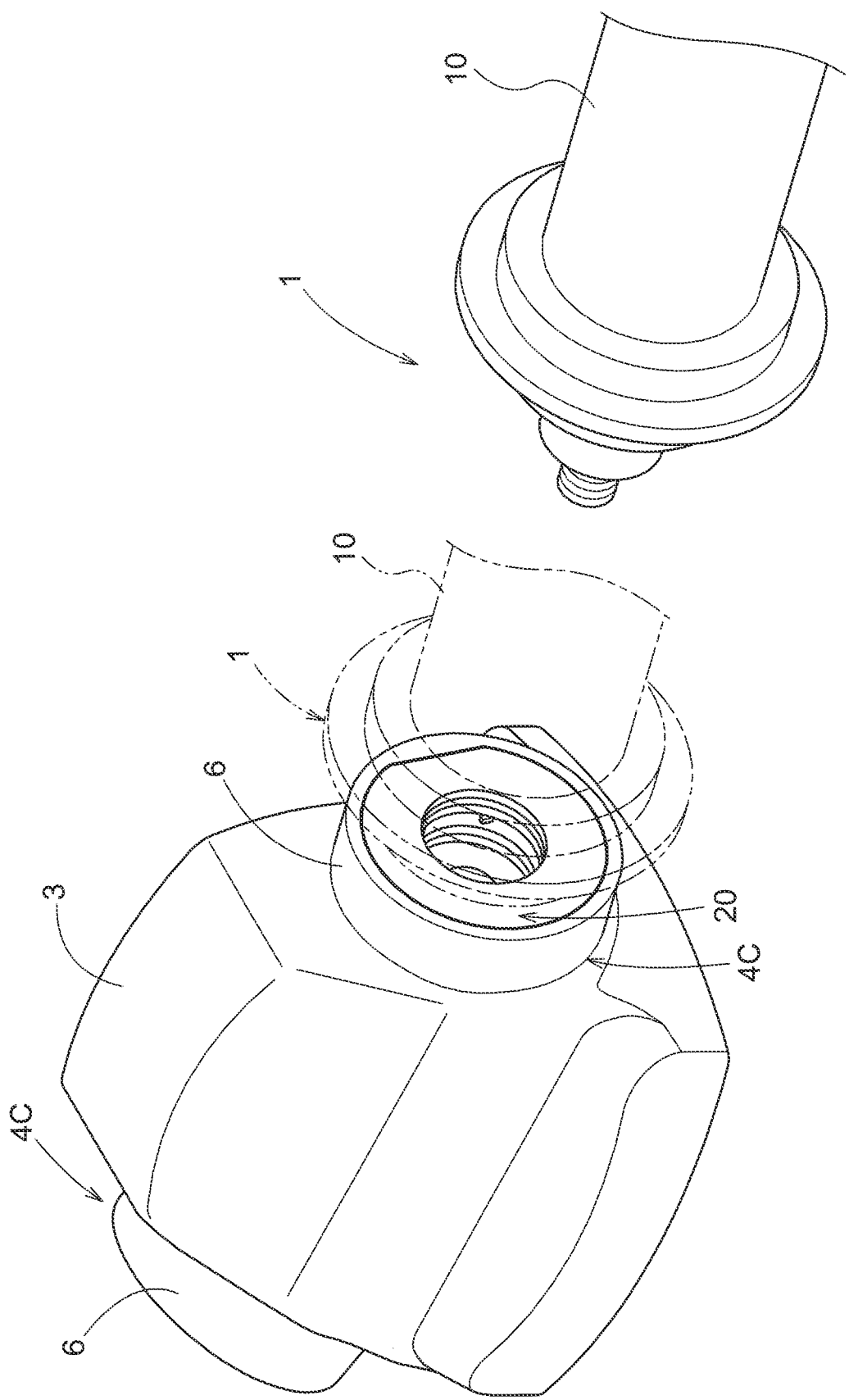
FIG. 2 is a diagram showing a handle removed from a main body case.
Figure 3:
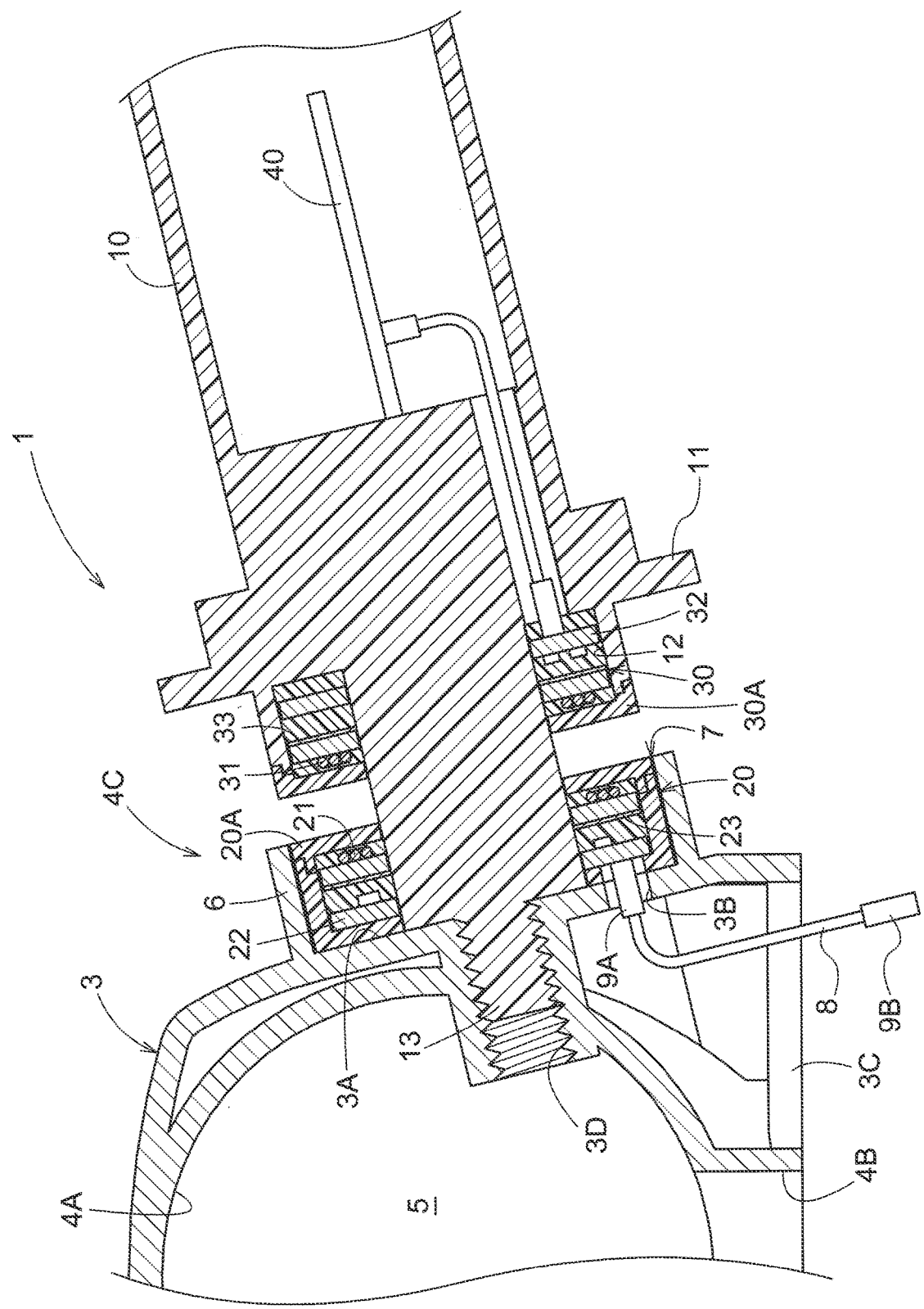
FIG. 3 is a partial cross-sectional view in which the handle is attached to the main body case.

The contactless power supply device 1 is constituted to include a handle 10, a power transmission module 20, a power reception module 30, and a detection unit 40. The handle 10 is configured to be attachable and detachable with respect to the main body case 3. FIG. 2 is a diagram showing the handle 10 removed from the main body case 3, with the state in which the handle 10 is attached to the main body case 3 being shown by a two-dot chain line. FIG. 3 is a partial cross-sectional view of the handle 10 attached to the main body case 3. Note that while a cover 10A is mounted to the handle 10 as shown in FIG. 1 so that the user can easily grip the handle 10, the cover 10A is omitted in FIGS. 2 and 3.

The handle 10 is constituted in a tubular shape using a resin material, and functions as an auxiliary grip for the user holding the main body part to grip when the disk grinder 2 is in use. In the main body case 3, a pair of mounting parts 4C are provided so as to intersect the surface on which the first opening portion 4A and the second opening portion 4B are respectively provided as shown in FIG. 2. The handle 10 is mounted with one side in the extension direction partially inserted into one of the pair of mounting parts 4C as shown in FIG. 3. The handle 10 is provided to extend laterally when the main body part is viewed along the extension direction of the main body part, and thus corresponds to a side grip.

The power transmission module 20 is provided to protrude from the main body case 3. As described above, the main body case 3 is provided such that the space 5 is formed therein, and the gear cover 2C and part of the housing 2D are housed in this space 5. The portion surrounding the space 5 that houses the gear cover 2C and part of the housing 2D corresponds to the main body case 3. Accordingly, the power transmission module 20 is provided on the outside with respect to this main body case 3. The power transmission module 20 is thereby provided to protrude from the main body case 3.

The power transmission module 20 is surrounded by a wall part 6 whose outer peripheral portion stands erect from the main body case 3. In this embodiment, the power transmission module 20 is constituted in a circle segment shape having a cutoff portion where part of the circular arc is cut off in plan view (as viewed in the extension direction of the handle 10).

Accordingly, the wall part 6 is configured in a circular shape that conforms to the cutoff portion. The cutoff portion functions to position and stop rotation of the power transmission module 20 with respect to the main body case 3. The power transmission module 20 is thereby housed in a space 7 that is formed by the main body case 3 and the wall part 6. Note that while the main body case 3 is constituted by a metallic material as described above, the wall part 6 may also be constituted by a metallic material.

The power transmission module 20 has a power transmission coil 21 that is electrified by power supplied to the main body part. The power supplied to the main body part is power supplied to the disk grinder 2. In this embodiment, the power supplied to the main body part corresponds to power supplied to the disk grinder 2 via a power cable 2F (see FIG. 1). An AC voltage of 100V is applied to the main body part via the power cable 2F. Power that is based on a voltage obtained by converting the frequency of the applied voltage or power that is based on a voltage obtained by converting the amplitude thereof may be supplied to the power transmission coil 21. The power transmission coil 21 corresponds to a primary coil of contactless power supply.

In this embodiment, the power transmission module 20 is electrically connected to the electric unit via a cable 8 that is inserted through a hole part 3B formed in a surface 3A of the main body case 3 facing the power transmission module 20. The surface 3A of the main body case 3 facing the power transmission module 20 is the surface facing the power transmission module 20 provided to protrude from the main body case 3. In the main body case 3, the hole part 3B is formed in this surface 3A. One end of the cable 8 is inserted through the hole part 3B, and the other end of the cable 8 is inserted through a hole part 3C formed in the surface on which the second opening portion 4B is provided. One end of the cable 8 is connected to the power transmission module 20 via the connector 9A, and the other end of the cable 8 is connected to the control board that controls the gear and actuator of the disk grinder 2 via a connector 9B.

In this embodiment, the power transmission module 20 is covered with a magnetic resin, apart from the surface on the side facing the power reception module 30. The magnetic resin is a resin having the properties of a magnetic substance. Such a magnetic resin is obtained by mixing and molding magnetic powders at the time of molding. In order to align the orientations of the magnetic axes of the magnetic powders, molding may be performed within a magnetic field. An outer peripheral portion of the power transmission module 20 is surrounded by the metal wall part 6 as described above. Also, the surface of the power transmission module 20 on the side facing the power reception module 30 at the time of contactless power supply is covered with a different material from the magnetic resin described above. In the example of FIG. 3, a lid part 20A of the power transmission module 20 formed using a resin material is provided on the side facing the power reception module 30 at the time of contactless power supply.

The power reception module 30 is housed in the handle 10 to face the power transmission module 20 when the handle 10 is fixed to the main body case 3. As described above, the handle 10 is constituted in a tubular shape. In particular, in this embodiment, as shown in FIG. 3, the one side in the extension direction and the other side in the extension direction are constituted to be hollow, and a flange past 11 is provided between the one side in the extension direction and the other side in the extension direction. Although not particularly limited to this configuration, the place where the flange part 11 is formed in the handle 10 is constituted to be columnar, that is, with the handle 10 filled with resin. The power reception module 30 is provided so as to be housed in a space 12 of the hollow on the one side in the extension direction with respect to the flange part 11 of the handle 10. Also, as described above, the handle 10 is supported with the one side in the extension direction partially inserted into one of the pair of mounting parts 4C. The power reception module 30 is thereby provided to face the power transmission module 20 provided on the main body case 3 side. At this time, a configuration need only be adopted in which the power transmission module 20 is changed to the side on which the handle 10 is mounted, out of the pair of mounting parts 4C.

The power reception module 30 has a power reception coil 31 that is contactlessly supplied with power via the power transmission coil 21. The power transmission coil 21 is provided in the power transmission module 20 described above. The power reception coil 31 corresponds to a secondary coil of contactless power supply. "Contactlessly supplied with power" refers to a power supply mode such as where power is transmitted by bringing the power reception coil 31 close to the power transmission coil 21 and inducing current in the power reception coil 31 via magnetic flux that is produced by current flowing through the power transmission coil 21. In this embodiment, the surface of the power reception module 30 on the one side in the extension direction of the handle 10 is covered with a lid part 30A made of a resin material.

Here, in this embodiment, the handle 10 is fixed to the main body case 3 by screwing a screw part 13 into a screw hole part 3D. The screw hole part 3D is provided in the main body case 3. The screw part 13 is provided on the one side of the handle 10 in the extension direction. Accordingly, the handle 10 is pushed in while being rotated with the axial center of the screw part 13 provided on the one side in the extension direction aligned with the axial center of the screw hole part 3D of the main body case 3 mounted to the disk grinder 2. The screw part 13 is thereby screwed into the screw hole part 3D, and the handle 10 is fixed to the main body case 3.

Also, the screw part 13 is provided in a central portion of the power reception coil 31 and a power reception board 32 included in the power reception module 30, as viewed in the axial direction of the screw part 13. As viewed in the axial direction of the screw part 13 is the state as viewed from the extension direction of the handle 10. The power reception board 32 is a board on which are mounted components for processing such as converting from current flowing through the power reception coil 31 into power necessary for driving the detection unit 40 described later and performing control such as transmitting detection information indicating detection results of the detection unit 40 to the power transmission coil 21, for example. It is favorable for such a power reception board 32 to be constituted using a rigid flexible board, for example. The power reception coil 31 is a coil that is used for contactless power supply via the power transmission coil 21 as described above. The power reception coil 31 is formed in a spiral shape coaxially with an axial center that coincides with the extension direction of the handle 10. A magnetic sheet 33 is provided on the back side of the power reception coil 31, and the power reception board 32 is further provided on the back side thereof. The magnetic sheet 33 and the power reception board 32 are formed in a circular shape coaxially with an axial center that coincides with the extension direction of the handle 10. Accordingly, the screw unit 13, in the state as viewed from the extension direction of the handle 10, is provided coaxially with the respective axial centers of the power reception board 32 formed in a circular shape on which components for processing such as converting from current flowing through the power reception coil 31 into power necessary for driving the detection unit 40 described later and controlling the transmission of detection information indicating detection results of the detection unit 40 to the power transmission coil 21 are mounted, the magnetic sheet 33 formed in a circular shape, and the power reception coil 31 formed in a spiral shape. It is favorable for the power reception module 30 to be constituted by being filled with resin in such a state.

The screw hole part 3D is provided in a central portion of the power transmission coil 21 and a power transmission board 22 included in the power transmission module 20, as viewed in the axial direction of the screw hole part 3D. As viewed in the axial direction of the screw hole part 3D is the state as viewed along the axial center of the screw hole part 3D. The power transmission board 22 is a board on which are mounted components for processing such as converting power supplied to the main body part into power suitable for current flowing through the power transmission coil 21 and controlling the current flowing through the power transmission coil 21, for example. It is favorable for such a power transmission board 22 to be constituted using a rigid flexible board, for example. The power transmission coil 21 is a coil that is used in contactless power supply to the power reception coil 31 as described above. The power transmission coil 21 is formed in a spiral shape coaxially with the axial center of the screw hole part 3D. A magnetic sheet 23 is provided on the back side of the power transmission coil 21, and the power transmission board 22 is further provided on the back side thereof. The magnetic sheet 23 and the power transmission board 22 are formed in a circular shape coaxially with the axial center of the screw hole part 3D. Accordingly, the screw hole part 3D, in the state as viewed along the axial center of the screw hole part 3D, is provided coaxially with the respective axial centers of the circular power transmission board 22 formed in a circular shape on which components for processing such as converting power supplied to the main body part into power suitable for current flowing through the power transmission coil 21 and controlling the current flowing through the power transmission coil 21 are mounted, the magnetic sheet 23 formed in a circular shape, and the power transmission coil 21 formed in a spiral shape. It is favorable for the power transmission module 20 to be constituted by being filled with resin in such a state.

By screwing such a screw part 13 into the screw hole part 3D and fixing the handle 10 to the main body case 3, assembly with the power transmission module 20 and the power reception module 30 appropriately aligned becomes possible. The power supply efficiency between the power transmission coil 21 and the power reception coil 31 can thereby be enhanced.

The detection unit 40 is provided in the handle 10, is driven based on power supplied via the power reception module 30, and detects whether the handle 10 is being gripped. As described above, the power reception module 30 is contactlessly supplied with power from the power transmission module 20. The detection unit 40 is driven by being supplied with power supplied to such a power reception module 30 as a power source. Whether the handle 10 is being gripped means whether the user who uses the disk grinder 2 is holding the handle 10. A configuration may be adopted in which a mechanism switch is provided in the handle 10, for example, and such a detection unit 40 detects the state of this mechanism switch, or the detection unit 40 may be constituted as a sensor so as to detect at least one of pressure, pyroelectricity, acceleration and capacitance, or as a functional unit that determines whether the handle 10 is being gripped by acquiring the detection result of such a sensor. The detection unit 40 can be configured not only to detect whether the handle 10 is being gripped, but also to detect the strength with which the handle 10 is being gripped, that is, the force with which the user holds the handle 10.

Figure 4:
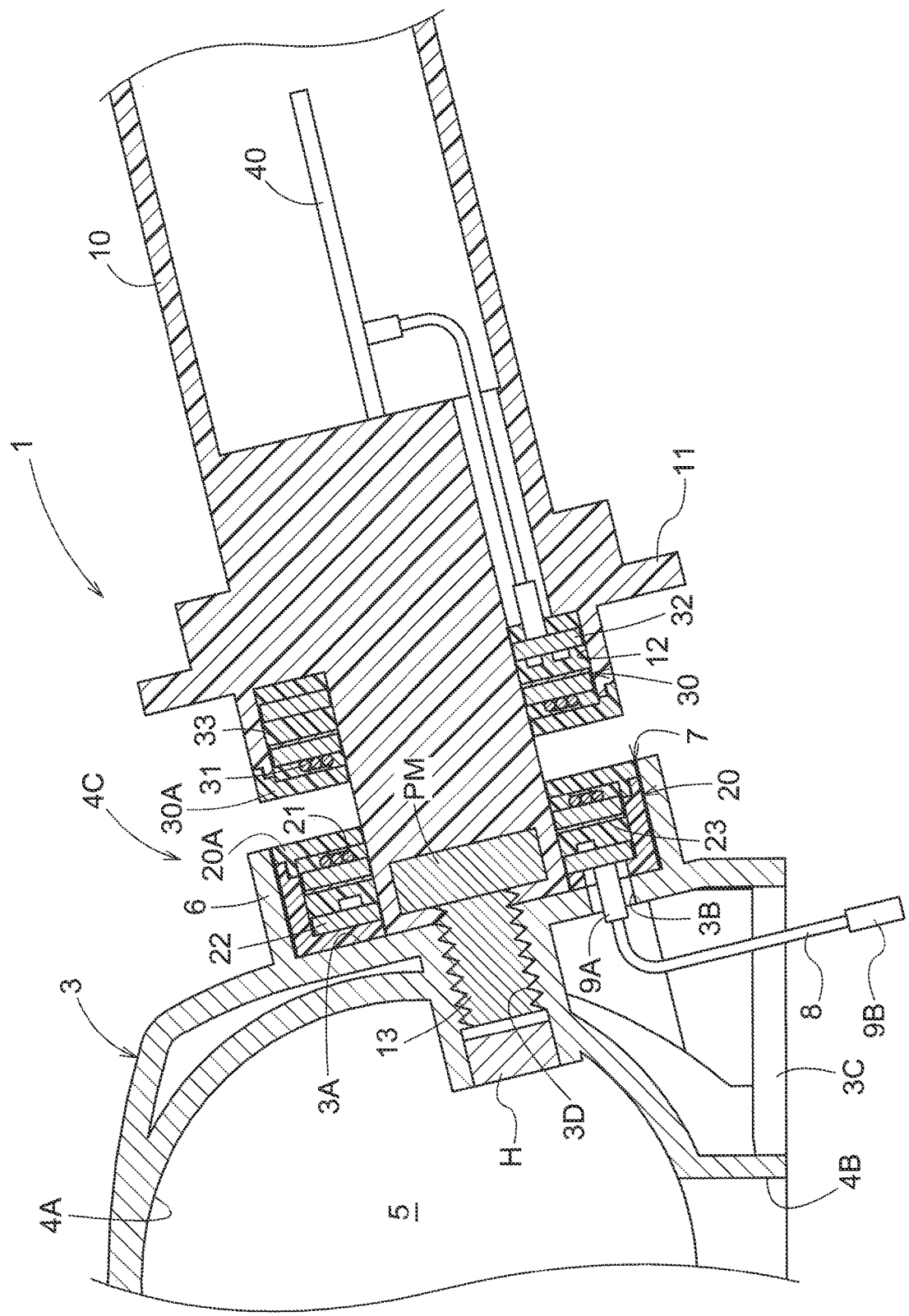
FIG. 4 is a partial cross-sectional view showing an example of the case where a permanent magnet is provided in the handle.

At this time, as shown in FIG. 4, the screw part 13 may be constituted using a magnetic material, a permanent magnet PM may be provided on a base end side of the screw part 13 of the handle 10, and a magnetic detection element H may be provided on a bottom side of the screw hole part 3D of the main body case 3. The magnetic material is a material having the property of retaining magnetic force such as iron, permalloy and ferrite, for example. The base end side of the screw part 13 refers to the side of the screw part 13 closer to the flange part 11, in the case where the screw part 13 is provided on the one end side in the extension direction of the handle 10 with respect to the flange part 11. That is, the opposite side to the side that advances into the screw hole part 3D when screwing in the screw part 13. The permanent magnet PM is an object that is magnetized in advance and produces a magnetic field in the surrounding area over an extended period of time. The bottom side of the screw hole part 3D refers to the side of the screw hole part 3D closer to the space 5. That is, the far side in the direction in which the screw part 13 advances when screwed into the screw hole part 3D. The magnetic detection element H is an element that functions to detect the magnitude or direction of the magnetic field or detect the magnetic flux density. Specifically, the magnetic detection element H corresponds to a Hall element or a magnetoresistance effect element, for example. Accordingly, the screw part 13 may be constituted using a material having the property of retaining magnetic force such as iron, permalloy and ferrite, for example, the permanent magnet PM may be provided on the side of the screw part 13 of the handle 10 closer to the flange part 11, and an element that functions to detect the magnitude or direction of the magnetic field or detect the magnetic flux density may be provided on the side of the screw hole part 3D of the main body case 3 closer to the space 5. In such a configuration, when the handle 10 is attached to the main body case 3, the magnetic flux of the permanent magnet PM can be caused to act on the magnetic detection element H from the tip side of the screw part 13. A characteristic of the magnetic flux density such as magnitude that is detected by the magnetic detection element H thereby changes, and the electric unit is able to detect that the handle 10 is attached to the main body case 3, thus enabling a configuration to be adopted in which current flows through the power transmission coil 21 only when the handle 10 is attached to the main body case 3.

The power transmission module 20 acquires detection information indicating the detection result of the detection unit 40 in response to contactless power supply. "In response to contactless power supply" means "in response to contactless power supply from the power transmission coil 21 of the power transmission module 20 to the power reception coil 31 of the power reception module 30". The detection result of the detection unit 40 is a detection result as to whether the user who uses the disk grinder 2 is holding the handle 10. Accordingly, the power transmission module 20 acquires detection information indicating the detection result as to whether the user who uses the disk grinder 2 is holding the handle 10, in response to contactless power supply from the power transmission coil 21 of the power transmission module 20 to the power reception coil 31 of the power reception module 30. Specifically, the power transmission module 20 supplies power to the power reception module 30 due to current flowing through the power transmission coil 21 and the magnetic flux produced by this current resulting in current being induced in the power reception coil 31 as described above, and, due to the power reception module 30 changing the load impedance of the power reception module 30 according to the detection result of the detection unit 40 during such power supply, the resonance state between the power reception coil 31 and the power transmission coil 21 changes and reflection occurs on the power transmission coil 21 side in response to this change, thus enabling the power transmission module 20 to acquire detection information indicating the detection result of the detection unit 40 by detecting and demodulating this reflection.

The power transmission module 20 outputs, to the electric unit, a control signal for controlling driving of the electric unit based on the acquired detection information. That is, the power transmission module 20 outputs a control signal for controlling the actuator of the disk grinder 2 to the control board that controls driving of the actuator, based on the detection information acquired in response to contactless power supply. For example, by configuring the control board to drive the actuator in the case where the control signal is acquired from the power transmission module 20, it become possible to stop or suspend driving of the actuator when the user is not holding the handle 10.

Other Embodiments

In the above embodiment, the handle 10 is described as being fixed to the main body case 3 by screwing the screw part 13 provided in the handle 10 into the screw hole part 3D provided in the main body case 3, but the handle 10 may be fixed by being mated using a spigot joint structure or may be fixed by snap fitting, for example. Fixing the handle 10 using magnetic force is also possible.

In the above embodiment, the screw part 13 is described as being provided in a central portion of the power reception coil 31 and the power reception board 32 included in the power reception module 30, as viewed in the axial direction of the screw part 13, but the screw part 13 need not be provided in the central portion of the power reception coil 31 and the power reception board 32 included in the power reception module 30, as viewed in the axial direction of the screw part 13. Also, the screw hole part 3D is described as being provided in a central portion of the power transmission coil 21 and the power transmission board 22 included in the power transmission module 20, as viewed in the axial direction of the screw hole part 3D, but the screw hole part 3D need not be provided in a central portion of the power transmission coil 21 and the power transmission board 22 included in the power transmission module 20, as viewed in the axial direction of the screw hole part 3D. In this case, it is similarly favorable for the power reception coil 31 and the power transmission coil 21 to face each other with the central portions thereof aligned.

In the above embodiment, the main body case 3 is described as being constituted by a metallic material, and the power transmission module 20 is described as being covered with a magnetic resin apart from the surface on the side facing the power reception module 30, but the main body case 3 may be constituted by a nonmetallic material, and the power transmission module 20 need not be covered with a magnetic resin.

In the above embodiment, the handle 10 is described as being constituted using a resin material, and being supported with part thereof on the one side in the extension direction inserted into one of the pair of mounting parts 4C, but the portion of the handle 10 (part thereof on the one side in the extension direction) that is inserted into one of the pair mounting parts 4C may be a magnetic resin.

In the above embodiment, the lid part 20A is described as being formed using a resin material, but the portion of the lid part 20A surrounding where the handle 10 is inserted may be formed with a magnetic resin (the magnetic resin portion is desirably formed to at least partially overlap with the power transmission coil 21 when the lid part 20A is viewed along the axial direction of the handle 10). The magnetic flux is thereby concentrated, thus enabling the power supply efficiency to be enhanced.

In the above embodiment, the power transmission module 20 is described as being electrically connected to the electric unit via the cable 8 that is inserted through the hole part 3B formed in the surface of the main body case 3 facing the power transmission module 20, but the power transmission module 20 can also be electrically connected to the electric unit by the cable 8 other than via the hole part 3B formed in the surface of the main body case 3 facing the power transmission module 20. It is also possible to adopt a configuration in which, in the case where the cable 8 is not provided, the power transmission module 20 and the electric unit are each provided with a terminal part, and the power transmission module 20 is provided in the main body case 3, for example, the terminal part of the power transmission module 20 and the terminal part of the electric unit are connected (electrically, mechanically connected) to each other.

In the above embodiment, the outer peripheral portion of the power transmission module 20 is described as being surrounded by the wall part 6 that stands erect from the main body case 3, but the wall part 6 need not be provided in the main body case 3, and the outer peripheral portion of the power transmission module 20 may be exposed. In this case, it is favorable for potting (resin potting) to be performed from the outer periphery of the power transmission module 20 to the main body case 3, for example.

In the above embodiment, the screw part 13 is described as being constituted using a magnetic material, the permanent magnet PM is described as being provided on the base end side of the screw part 13 of the handle 10, and the magnetic detection element H is described as being provided on the bottom side of the screw hole part 3D of the main body case 3, but a configuration can also be adopted in which a reed switch is provided on the bottom side of the screw hole part 3D of the main body case 3. With this configuration, it is similarly possible to detect the screw part 13 that has advanced into the screw hole part 3D with the reed switch.

In the above embodiment, a configuration using the permanent magnet PM and the magnetic detection element H as a method for detecting attachment is described, but it is also alternatively possible to emit a signal for searching for a power reception unit from the power transmission unit at regular intervals for the purpose of confirming docking (attachment), and for docking to be detected due to a power reception unit that has docked (been attached) receiving the signal and changing the load impedance (responding by load communication).

In the above embodiment, the disk grinder 2 is described as an example of the electric device 2, but the electric device 2 may be other power tools such as an electric drill or an electric saw. The electric device 2 may, of course, also be devices that are electrically operated other than power tools, such as playground equipment, a toy, a bicycle or a motorcycle. In this case, the handle 10 can be constituted as a handle of the playground equipment, toy, bicycle or motorcycle.

This disclosure can be applied to contactless power supply devices that supply power contactlessly using a power transmission coil and a power reception coil.

What is claimed is:

1. A contactless power supply device comprising:
    a handle attachable and detachable with respect to a main body case at least partially covering a main body part including an electric unit;
    a power transmission module to be provided to protrude from the main body case, and having a power transmission coil electrified based on power supplied to the main body part;
    a power reception module housed in the handle to face the power transmission module when the handle is fixed to the main body case, and having a power reception coil contactlessly supplied with power via the power transmission coil; and
    a detection unit provided in the handle, driven based on the power supplied via the power reception module, and configured to detect whether the handle is being gripped,
    wherein the power transmission module acquires detection information indicating a detection result of the detection unit in response to the contactless power supply, and outputs, to the electric unit, a control signal for controlling driving of the electric unit based on the detection information,
    the handle is fixed to the main body case by screwing a screw part provided in the handle into a screw hole part provided in the main body case,
    the screw part is provided in a central portion of the power reception coil and a power reception board included in the power reception module, as viewed in an axial direction of the screw part, and
    the screw hole part is provided in a central portion of the power transmission coil and a power transmission board included in the power transmission module, as viewed in an axial direction of the screw hole part.

2. The contactless power supply device according to claim 1
    wherein the main body case is constituted by a metallic material, and
    the power transmission module is covered with a magnetic resin, apart from a surface on a side facing the power reception module.

3. The contactless power supply device according to claim 2,
    wherein the power transmission module is to be electrically connected to the electric unit via a cable inserted through a hole part formed in a surface of the main body case facing the power transmission module.

4. The contactless power supply device according to claim 2,
    wherein an outer peripheral portion of the power transmission module is surrounded by a wall part standing erect from the main body case.

5. The contactless power supply device according to claim 2,
    wherein the handle is fixed to the main body case by screwing a screw part provided in the handle into a screw hole part provided in the main body case,
    the screw part is constituted using a magnetic material, and
    a permanent magnet is provided on a base end side of the screw part of the handle, and a magnetic detection element is provided on a bottom side of the screw hole part of the main body case.

6. The contactless power supply device according to claim 2,
    wherein the handle is fixed to the main body case by screwing a screw part provided in the handle into a screw hole part provided in the main body case,
    the screw part is constituted using a magnetic material, and
    a permanent magnet is provided on a base end side of the screw part of the handle, and a reed switch is provided on a bottom side of the screw hole part of the main body case.

7. The contactless power supply device according to claim 1,
    wherein the power transmission module is to be electrically connected to the electric unit via a cable inserted through a hole part formed in a surface of the main body case facing the power transmission module.

8. The contactless power supply device according to claim 1,
    wherein an outer peripheral portion of the power transmission module is surrounded by a wall part standing erect from the main body case.

9. The contactless power supply device according to claim 1,
    wherein the handle is fixed to the main body case by screwing a screw part provided in the handle into a screw hole part provided in the main body case,
    the screw part is constituted using a magnetic material, and
    a permanent magnet is provided on a base end side of the screw part of the handle, and a magnetic detection element is provided on a bottom side of the screw hole part of the main body case.

10. The contactless power supply device according to claim 1,
    wherein the handle is fixed to the main body case by screwing a screw part provided in the handle into a screw hole part provided in the main body case,
    the screw part is constituted using a magnetic material, and
    a permanent magnet is provided on a base end side of the screw part of the handle, and a reed switch is provided on a bottom side of the screw hole part of the main body case.

11. A contactless power supply device comprising:
    a handle attachable and detachable with respect to a main body case at least partially covering a main body part including an electric unit;

a power transmission module to be provided to protrude from the main body case, and having a power transmission coil electrified based on power supplied to the main body part;

a power reception module housed in the handle to face the power transmission module when the handle is fixed to the main body case, and having a power reception coil contactlessly supplied with power via the power transmission coil; and a detection unit provided in the handle, driven based on the power supplied via the power reception module, and configured to detect whether the handle is being gripped, wherein the power transmission module acquires detection information indicating a detection result of the detection unit in response to the contactless power supply, and outputs, to the electric unit, a control signal for controlling driving of the electric unit based on the detection information, the main body case is constituted by a metallic material, and the power transmission module is covered with a magnetic resin, apart from a surface on a side facing the power reception module.

12. The contactless power supply device according to claim 11, wherein the power transmission module is to be electrically connected to the electric unit via a cable inserted through a hole part formed in a surface of the main body case facing the power transmission module.

13. The contactless power supply device according to claim 11, wherein an outer peripheral portion of the power transmission module is surrounded by a wall part standing erect from the main body case.

14. The contactless power supply device according to claim 11, wherein the handle is fixed to the main body case by screwing a screw part provided in the handle into a screw hole part provided in the main body case, the screw part is constituted using a magnetic material, and a permanent magnet is provided on a base end side of the screw part of the handle, and a magnetic detection element is provided on a bottom side of the screw hole part of the main body case.

15. The contactless power supply device according to claim 11, wherein the handle is fixed to the main body case by screwing a screw part provided in the handle into a screw hole part provided in the main body case, the screw part is constituted using a magnetic material, and a permanent magnet is provided on a base end side of the screw part of the handle, and a reed switch is provided on a bottom side of the screw hole part of the main body case.

16. A contactless power supply device comprising:

a handle attachable and detachable with respect to a main body case at least partially covering a main body part including an electric unit;

a power transmission module to be provided to protrude from the main body case, and having a power transmission coil electrified based on power supplied to the main body part;

a power reception module housed in the handle to face the power transmission module when the handle is fixed to the main body case, and having a power reception coil contactlessly supplied with power via the power transmission coil; and a detection unit provided in the handle, driven based on the power supplied via the power reception module, and configured to detect whether the handle is being gripped, wherein the power transmission module acquires detection information indicating a detection result of the detection unit in response to the contactless power supply, and outputs, to the electric unit, a control signal for controlling driving of the electric unit based on the detection information, the power transmission module is to be electrically connected to the electric unit via a cable inserted through a hole part formed in a surface of the main body case facing the power transmission module.

* * * * *